(12) United States Patent
Foerch et al.

(10) Patent No.: US 10,640,098 B2
(45) Date of Patent: May 5, 2020

(54) BRAKE DEVICE FOR A VEHICLE

(71) Applicant: Robert Bosch GmbH, Stuttgart (DE)

(72) Inventors: Dirk Foerch, Neuenstadt/Stein (DE); Matthias Kistner, Bretzfeld (DE); Simon Hansmann, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 15/670,644

(22) Filed: Aug. 7, 2017

(65) Prior Publication Data
US 2018/0056957 A1   Mar. 1, 2018

(30) Foreign Application Priority Data

Aug. 25, 2016   (DE) .................. 10 2016 215 962

(51) Int. Cl.
| | |
|---|---|
| *B60T 11/20* | (2006.01) |
| *B60T 13/04* | (2006.01) |
| *B60T 13/14* | (2006.01) |
| *B60T 11/236* | (2006.01) |
| *B60T 17/08* | (2006.01) |

(52) U.S. Cl.
CPC ............ *B60T 13/143* (2013.01); *B60T 11/20* (2013.01); *B60T 11/236* (2013.01); *B60T 13/04* (2013.01); *B60T 17/088* (2013.01)

(58) Field of Classification Search
CPC ...... B60T 11/236; B60T 11/20; B60T 13/143; B60T 13/04
See application file for complete search history.

(56) References Cited

U.S. PATENT DOCUMENTS

| | | | | |
|---|---|---|---|---|
| 4,608,825 | A * | 9/1986 | Fontaine | B60T 13/72 180/272 |
| 4,940,290 | A * | 7/1990 | Nishii | B60T 13/146 188/151 A |
| 7,127,891 | B2 * | 10/2006 | Ohlig | B60T 8/4077 60/547.1 |
| 7,181,911 | B2 * | 2/2007 | Ishikawa | B60T 11/232 60/585 |
| 2002/0124563 | A1 * | 9/2002 | Ogiwara | B60T 11/224 60/588 |
| 2012/0247099 | A1 * | 10/2012 | Omune | B60T 11/236 60/533 |
| 2015/0246664 | A1 * | 9/2015 | Tanabe | F16J 15/3236 60/586 |
| 2016/0200304 | A1 * | 7/2016 | Owada | F16J 15/164 60/585 |

* cited by examiner

*Primary Examiner* — Michael Leslie
*Assistant Examiner* — Dustin T Nguyen
(74) *Attorney, Agent, or Firm* — Norton Rose Fulbright US LLP; Gerard Messina

(57) ABSTRACT

A braking device for a vehicle, in particular a motor vehicle, including an actuatable brake pedal, a piston of a master brake cylinder mechanically coupled to the brake pedal, the piston being supported in the master brake cylinder so as to be axially displaceable in an actuation direction and in a release direction, and including at least one radial seal that acts between the piston and the master brake cylinder. At least one elastically deformable and/or displaceable damping element opposes the displacement of the piston in the release direction.

5 Claims, 5 Drawing Sheets

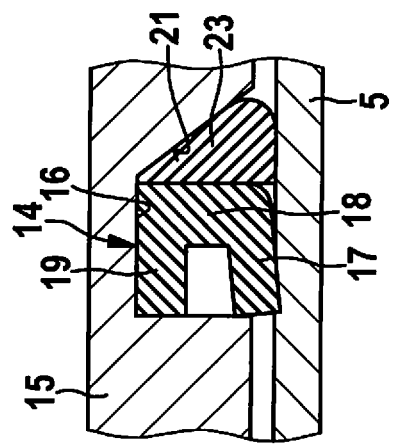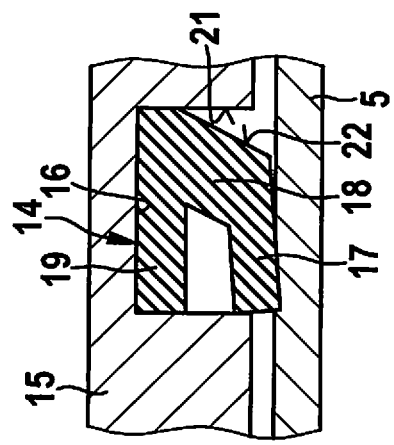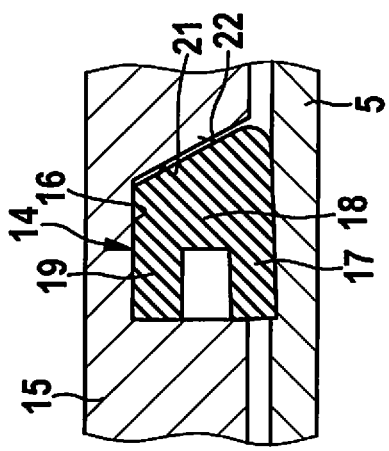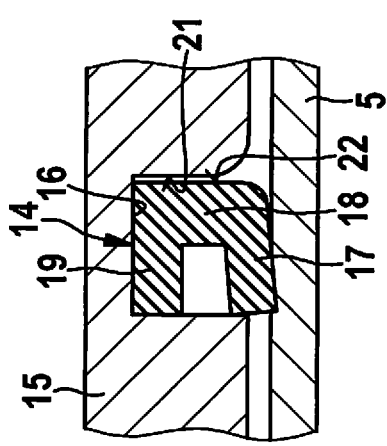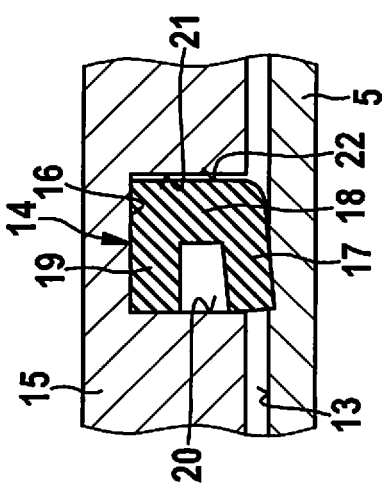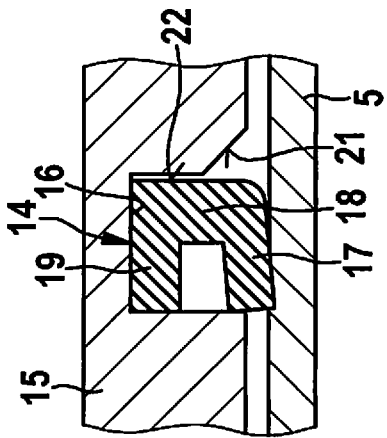

BRAKE DEVICE FOR A VEHICLE

CROSS REFERENCE

The present application claims the benefit under 35 U.S.C. § 119 of German Patent Application No. DE 102016215962.3 filed on Aug. 25, 2016, which is expressly incorporated herein by reference in its entirety.

FIELD

The present invention relates to a braking device for a vehicle, in particular a motor vehicle, including an actuatable brake pedal, including a piston of a master brake cylinder that is mechanically coupled to the brake pedal, the piston being supported in the master brake cylinder so as to be axially displaceable in an actuation direction and in a release direction, and including at least one radial seal that acts between the piston and the master brake cylinder.

BACKGROUND INFORMATION

Conventional braking devices have an actuatable brake pedal that communicates directly with a master brake cylinder or, for example, indirectly via a vacuum brake booster. The brake pedal is thereby coupled to a piston that is disposed axially displaceably in the master brake cylinder and is displaced in an actuation direction in response to actuation of the brake pedal in order to generate a pressure in a hydraulic brake circuit. A special property of the vacuum brake booster is that it assists the user upon actuation of the brake pedal and damps the return movement of the piston in the release direction, thereby limiting the release speed of the brake pedal. This provides an improved pedal feel for the driver and prevents a rapid release of the brake pedal, respectively a high speed striking thereof against a limit stop. Disturbing impact noises are thereby prevented, for example. More recent braking devices eliminate the need for a vacuum brake booster, allowing the brake pedal to communicate directly with the master brake cylinder. A boost control force is then generated electrohydraulically or electromotively, for example. However, the driver then perceives as missing the known and typically reduced release speed, respectively damping of the brake pedal during the release.

SUMMARY

An example braking device according to the present invention may have the advantage of once again making the brake pedal feel recognizable to the driver. It corresponds, at least substantially, to that of a conventional brake pedal that communicates via a vacuum brake booster with the master brake cylinder. This enhances the acceptance of a braking device that functions without a vacuum brake booster. This is achieved by the present invention in that the braking device has at least one damping element that opposes the displacement of the piston in the release direction, in particular only or at least generally only in the release direction, for that purpose, the damping element being designed to be elastically deformable or displaceable. Thus, to damp the piston movement in the release direction, a simple mechanical approach is provided that may be realized inexpensively and integrated in the braking device without any special space requirements.

One preferred specific embodiment of the present invention provides that the damping element be pretensioned by spring force against an outer peripheral wall of the piston in a way that allows a resulting contact pressure of the damping element to act in the actuation direction. The damping element hereby acts against the release direction. The spring force readily ensures the pretensioning, and the contact pressure is made available on a sustained basis. Because the contact pressure acts in the actuation direction, the piston movement is facilitated in the actuation direction and impeded, respectively damped in opposition to the actuation direction, thus in the release direction. As a result, the pressure angle of the damping element on the piston readily makes it possible for the damping action to be influenced or regulated, for example.

It is also preferably provided that the elastically deformable radial seal form the damping element. Thus, the damping action is integrated directly in the radial seal. The radial seal is usually designed to be elastically deformable in any case, so that the spring force is produced by the radial seal itself, whereby the additional damping action may be integrated without entailing any substantial outlay in the braking device. The damping action advantageously acts only in response to a movement of the piston in the release direction, not, however, in response to a movement of the damping piston in the actuation direction, so that a rapid actuation of the brake pedal is not hindered, nor, therefore, is the rapid generation of a desired braking force.

An advantageous embodiment of the present invention provides that the damping element have at least an L- or U-shaped cross section, having at least one sealing leg for lateral engagement on the piston, and having a supporting leg, the supporting leg extending in particular at least generally radially to the piston, and, starting from the supporting leg, the sealing leg extending in the actuation direction. Thus, the sealing leg extends, in particular, nearly or exactly parallel to the actuation direction of the piston, respectively to the longitudinal axis thereof, so that, via a lateral outer surface, it directly contacts the piston, upon which the aforementioned contact pressure acts. The contact pressure is thereby transmitted to the contact area at least essentially by the supporting leg, and the direction of action is influenced by the extent of the sealing leg. The damping action of the damping element, for example, of the radial seal, generally acts only in the release direction, not, however, in the actuation direction, due, in particular, to an inclination of the sealing leg relative to the outer peripheral surface of the piston. It is preferably provided that the damping element be adapted to act in a self-inhibiting and thus in a friction force-increasing manner in the release direction, thus when the piston is moved in the release direction.

To that end, it is preferably provided that the sealing leg form an acute angle with the outer peripheral surface of the piston, so that an unattached end of the sealing leg faces the piston. The sealing leg is thereby slanted, readily ensuring the self-inhibiting of the sealing element. The damping element is advantageously held in positive engagement on the side opposite the piston on or in a housing, for example, in the housing of the master brake cylinder, so that the damping force is exerted from the housing, via the damping element, on the piston in response to displacement of the same.

It is also preferably provided that the supporting leg have an axial supporting surface that faces away from the sealing leg and is radially oriented to form an acute or an obtuse angle with the sealing leg. In response to displacement of the piston in the release direction, the damping element braces itself by the axial supporting surface against the housing or another permanently installed holding device. The self-inhibiting of the damping element upon displacement of the piston in the release direction increases the force acting on the axial supporting surface and, as a result, also the frictional force between the sealing leg and the piston. The axial supporting surface may be radially oriented or form an acute or obtuse angle with the sealing leg; this being selected in particular as a function of the embodiment of a recess that holds the damping element.

One preferred embodiment of the present invention provides that the annular damping element rest in an annular radial recess of the master brake cylinder, in particular; the radial recess having a first side wall and an axially opposing second side wall; and the damping element at least resting axially against the second side wall, in particular by the axial supporting surface thereof in response to displacement of the piston in the release direction. The already mentioned advantages are hereby derived. Positioning the annular damping element in the annular radial recess ensures a secure locking in place, respectively placement of the damping element in the braking device. In particular, it is provided that the second side wall, at least in portions thereof, have a slanted or curved configuration in the release direction of the piston. This forms a spacing between the axial supporting surface of the damping element and the second side wall into which the damping element may be pressed upon displacement of the piston in the release direction. This makes it easier to achieve the self-inhibiting.

Furthermore, it is preferably provided that the damping element is situated at an unattached end of a rocker arm; the unattached end being pretensioned by a spring element against the outer peripheral wall of the piston. Thus, the damping element, itself, does not need to be deformable, however, it is preferable. The spring element pretensions the damping element against the outer peripheral wall of the piston, thereby forming a contact pressure that leads to a friction between the damping element and the piston and thus to a damping of the movement. Because the damping element is configured at the unattached end of the rocker arm, a preferential direction is also derived in which the damping element acts. Here as well, the damping force, respectively the contact pressure is enhanced when the piston is displaced in the release direction. For this purpose, the rocker arm is advantageously obliquely oriented to the longitudinal or middle axis of the piston; the unattached end facing the actuation direction of the piston.

It is also preferably provided that the damping element be present in addition to the at least one radial seal and, in particular, be configured outside of the master brake cylinder. Thus, the damping element may either be constituted of the radial seal itself, respectively perform a sealing action in addition to the damping action, or the damping element is provided in addition to the radial seal, so that the functions, and thus the radial seal and damping element, may be separately optimally adapted to their respective task. If the damping element is formed separately, it is preferably configured outside of the master brake cylinder, so that integrating the damping element does not influence or at least does not substantially influence the design of the master brake cylinder.

Moreover, an advantageous embodiment of the present invention provides that the damping element be formed as an elastically deformable clip element that is mounted by clipping in of the same, in particular in the radial recess. This ensures a simple mounting of the damping element. In particular, if the damping element is configured separately from the radial seal, the clip element may be formed without entailing any substantial outlay. To this end, the damping element may be fabricated of an elastically deformable plastic, for example, and have elastically deformable regions, for example, that cooperate with the piston.

Another specific embodiment of the present invention preferably provides that the damping element be a pneumatic non-return valve that seals a pressure chamber surrounding the piston and that it be comovable with the piston. The pressure chamber is formed, for example, by a cylindrical sleeve that surrounds the piston, in particular coaxially, together with the piston and an end face seal, for example in the form of a disk, in particular an annular disk; in this seal, the non-return valve being configured to allow the non-return valve to open in response to a movement of the piston in the actuation direction and thereby permit a simple displacement; and close in the release direction, allowing a damping pressure, in particular a pressure below atmospheric (partial vacuum), to ensue in the pressure chamber that opposes the further movement of the piston and thereby damps the movement as previously described.

The present invention is explained in greater detail below with reference to the figures.

BRIEF DESCRIPTION OF THE DRAWINGS

FIG. 2A through 2F show different exemplary embodiments of the braking device.

DETAILED DESCRIPTION OF EXAMPLE EMBODIMENTS

Figure 1:
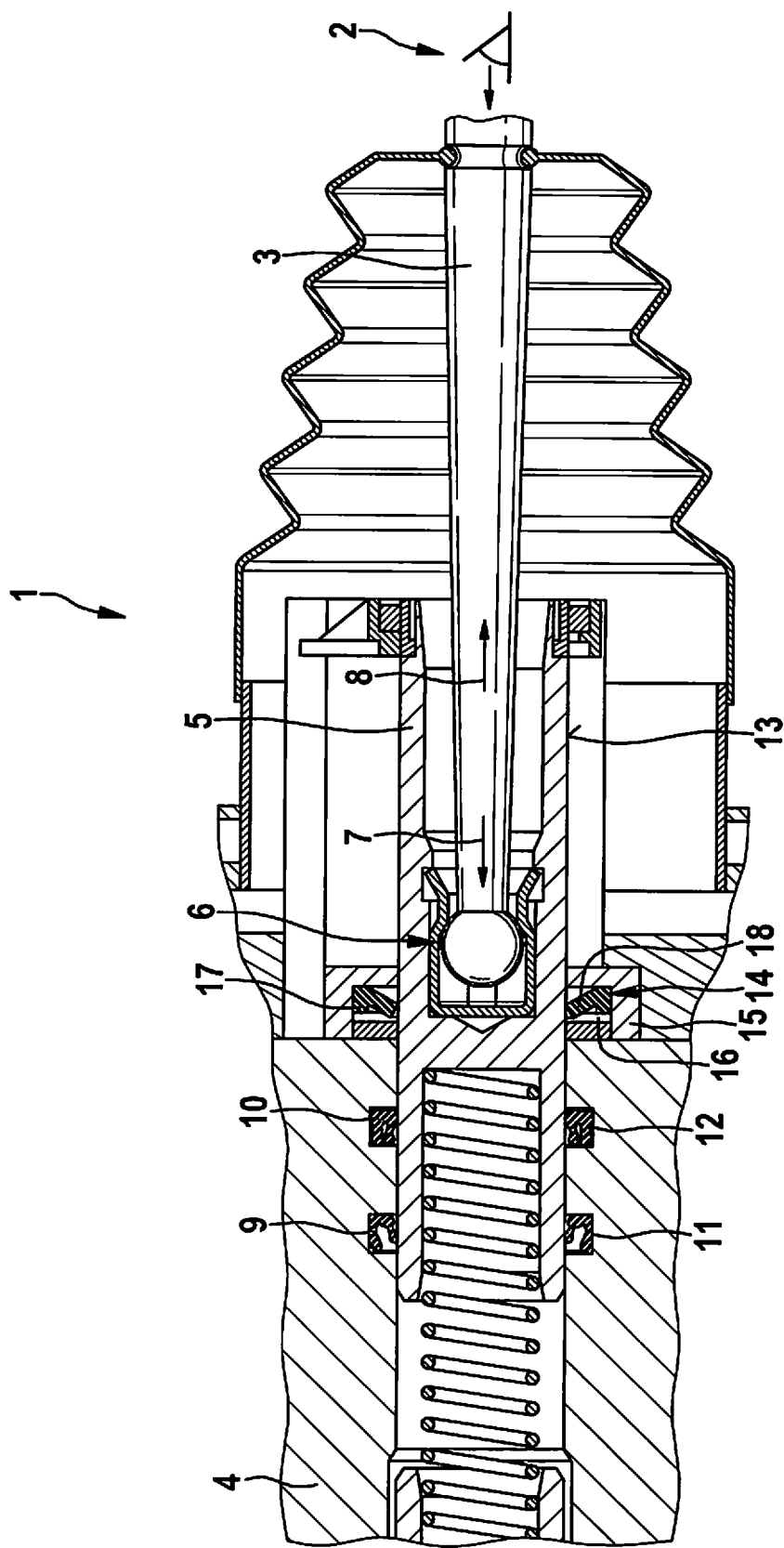
FIG. 1 shows a braking device for a motor vehicle in a detailed cross-sectional view.

In a detailed cross-sectional view, FIG. 1 shows a braking device 1 for a motor vehicle. Braking device 1 features a brake pedal 2, shown in simplified form, that is directly coupled by a linkage 3 to a master brake cylinder 4 of braking device 1, thus without the interposition of a vacuum brake booster. A piston 5 is axially displaceably mounted in master brake cylinder 4. Piston 5 is thereby connected by an articulated connection 6 to linkage 3. In response to an actuation of brake pedal 2, piston 5 is displaced in master brake cylinder 4 in a first direction, namely in the actuation direction indicated by arrow 7, thereby producing a hydraulic pressure in master brake cylinder 4 that is transmitted to one or a plurality of wheel brakes. In response to releasing of brake pedal 2, respectively termination of the actuation thereof, linkage 3, respectively piston 5 is moved rearwardly, as indicated by arrow 8, opposite the actuation direction indicated by arrow 7. At this point, the above-mentioned principle of operation of piston 5 in master brake cylinder 4 will not be explained in greater detail since this is generally conventional. In the present case, however, it should be noted that piston 5 is radially sealed from master brake cylinder 4 by two radial seals 9 and 10, thereby resulting in different, mutually separate regions on the outer side of piston 5 over the longitudinal extent thereof. A high-pressure portion and a low-pressure portion, for example, are hereby separated from one another. Radial seals 9, 10 are fabricated from elastically deformable material, for example, elastomer, and, in each case, are inset in an annular, radial recess 11, respectively 12, so that, viewed in the axial direction, respectively in the direction of movement of piston 5, they are held in positive engagement. To ensure a reliable sealing, the inherent elasticity thereof pretensions them against outer peripheral wall 13 of piston 5.

Another advantageous exemplary embodiment of the present invention provides that a damping element 14 be provided that is pretensioned against outer peripheral wall 13 of piston 5 in a way that allows it to oppose the movement of piston 5 in the release direction in accordance with arrow 8 and not or negligibly influence piston 5 in response to a movement in actuation direction 7.

To that end, damping element 14 has an annular shape and is fixedly mounted on master brake cylinder 4 coaxially to piston 5. In the present case, damping element 14 is configured outside of master brake cylinder 4 at the unattached end face thereof. To that end, configured or located on master brake cylinder 4 is a retaining flange 15 that forms a receiving recess 16 that is annular in shape and thus extends over the entire periphery of piston 5. Damping element 14 is inserted into or held in this radial recess 16. As are radial seals 9, 10 as well, damping element 14 is held in axial positive engagement in radial recess 16 associated therewith. Damping element 14 is thereby radially braced, on the one hand, against flange 15 (outwardly) and, on the other hand, against piston 5 (inwardly).

In accordance with the present exemplary embodiment, damping element 14 has an L-shaped form and, for that purpose, has a supporting leg 17, as well as a sealing leg 18, that, together, form an acute angle. Supporting leg 17 is thereby associated radially outwardly with flange 15 and essentially extends parallel to the actuation direction of piston 5. On the other hand, sealing leg 18 is inclined, respectively obliquely oriented and, by unattached end thereof, thereby faces actuation direction 7 of piston 5.

In response to actuation of brake pedal 2 at this point, piston 5 is introduced into master brake cylinder 4. Sealing leg 18, which rests against piston 5, yields, further reducing in size the angle between sealing leg 18 and supporting leg 17. Due to the elasticity of damping element 14, the frictional force between damping element 14 and piston 5 hardly increases or does not increase. However, if brake pedal 2 is released and piston 5 is moved in the release direction, as indicated by arrow 8, then sealing leg 18 is comoved in the release direction due to the friction between peripheral wall 13 and sealing leg 18. This upsets sealing leg 18 and increases the frictional force between piston 5 and sealing leg 18, respectively damping element 14. The self-inhibiting of damping element 14 in the release direction is thus achieved or enhanced by the movement in the release direction.

Brake pedal 2 is hereby not able to suddenly or quickly return to the initial position thereof and, for example, strike a limit stop. Disturbing noises are thereby prevented during operation, and the same brake pedal feel is conveyed to the driver that he/she knows from braking devices having a vacuum brake booster.

FIG. 2A through 2F show different alternative exemplary embodiments for damping element 14, in each instance in a simplified sectional view.

The different exemplary embodiments of FIG. 2A through 2F have in common that damping element 14 has a generally U-shaped cross section in each case. In this case, damping element 14 features sealing leg 17 and supporting leg 18, as well as another supporting leg 19 opposite sealing leg 17. Supporting leg 19 is held axially form-lockingly or at least substantially form-lockingly in radial recess 16; thus a small amount of clearance may be provided axially.

In contrast to the exemplary embodiment of FIG. 1, damping element 14 in accordance with FIG. 2A is configured to allow sealing leg 17 to form a smaller angle with piston 5, respectively with the longitudinal axis thereof. In comparison to the exemplary embodiment of FIG. 1, this reduces the damping effect when piston moves in release direction 5. The radial recess features a first side wall 20 and, opposite thereto, a second side wall 21 which is oriented radially to the piston axis in accordance with the exemplary embodiment of FIG. 2A. Thus, in response to a movement of piston 5 in the actuation direction, damping element 14 is urged against first side wall 20 and, in response to a movement of piston 5 in the release direction, against side wall 21. Thus, axial supporting surface 22 of damping element 14 that faces side wall 21 and is formed on supporting leg 18 is pressed against second side wall 21 and prevents a further comovement of sealing leg 17, which is pretensioned against outer peripheral wall 13 of piston 5. This ensures that sealing leg 17 still rests securely against piston 5 and thereby provides sufficient damping action upon displacement of the same in the release direction.

The exemplary embodiment of FIG. 2B provides that side wall 21 be obliquely oriented to form an acute angle with sealing leg 17, respectively with the outer peripheral wall of piston 5. In this instance, supporting leg 18 is adapted to the form design of side wall 21, so that axial supporting surface 22 now likewise extends obliquely. This produces an area of damping element 14 that may be further compressed due to the elasticity thereof. Sealing leg 17 is able to be thereby pressed even more firmly against outer peripheral wall 13 in response to a movement of piston 5, enhancing the damping action.

In accordance with the exemplary embodiment of FIG. 2C, the space gained by the sloped form of side wall 21 is filled by an additional element, in particular an elastomer element 23. Thus, depending on the modulus of elasticity of element 23, the damping action of damping element 14 for piston 5 may be influenced, respectively set to a desired value in response to a movement in the release direction.

The exemplary embodiment of FIG. 2D provides that side wall 21 have a slanted configuration only in portions thereof, namely in an end region facing piston 5, whereby a free space is formed between axial supporting surface 18 and side wall 21. Thus, in response to a movement of piston 5 in the release direction, material of damping element 14 is pushed into the free space, thereby increasing the slant of sealing leg 17, leading to a greater contact pressure and thus to an enhanced damping of the movement of piston 5 in the release direction.

The exemplary embodiment of FIG. 2E differs from the preceding exemplary embodiment merely in that the slanted region of side wall 21 now has a curvature. The already mentioned advantages of the preceding exemplary embodiment are hereby derived.

The exemplary embodiment of FIG. 2F provides that supporting leg 18 be obliquely oriented, so that, here as well, a free space is produced between second side wall 21, which, in this case, features a continuous, radial orientation, and axial supporting surface 22. Here as well, sealing leg 17 is configured with the unattached end thereof in the actuation direction, starting from supporting leg 18, and forms an acute angle with piston 5, respectively longitudinal middle axis thereof, to achieve the damping action, as already mentioned above, merely in response to a movement of piston 5 in the release direction in accordance with arrow 8.

While the exemplary embodiments shown in FIGS. 1 and 2A through 2F relate to damping element 14, which is provided separately from radial seals 9 and 10, another exemplary embodiment provides that damping element 14 be constituted of one of radial seals 9 or 10, thereby eliminating the need for an additional damping element. In such a case, damping element 14 and/or damping element 10 are/is then formed in accordance with one of the variants of damping element 14.

At the same time, a seal is ensured by the pretensioning produced against outer peripheral wall 13, as well as by the annular formation. If damping element 14 is formed as a separate damping element, as shown in FIG. 1, there is no need for an annular configuration, since no sealing function is accorded thereto.

Figure 3:
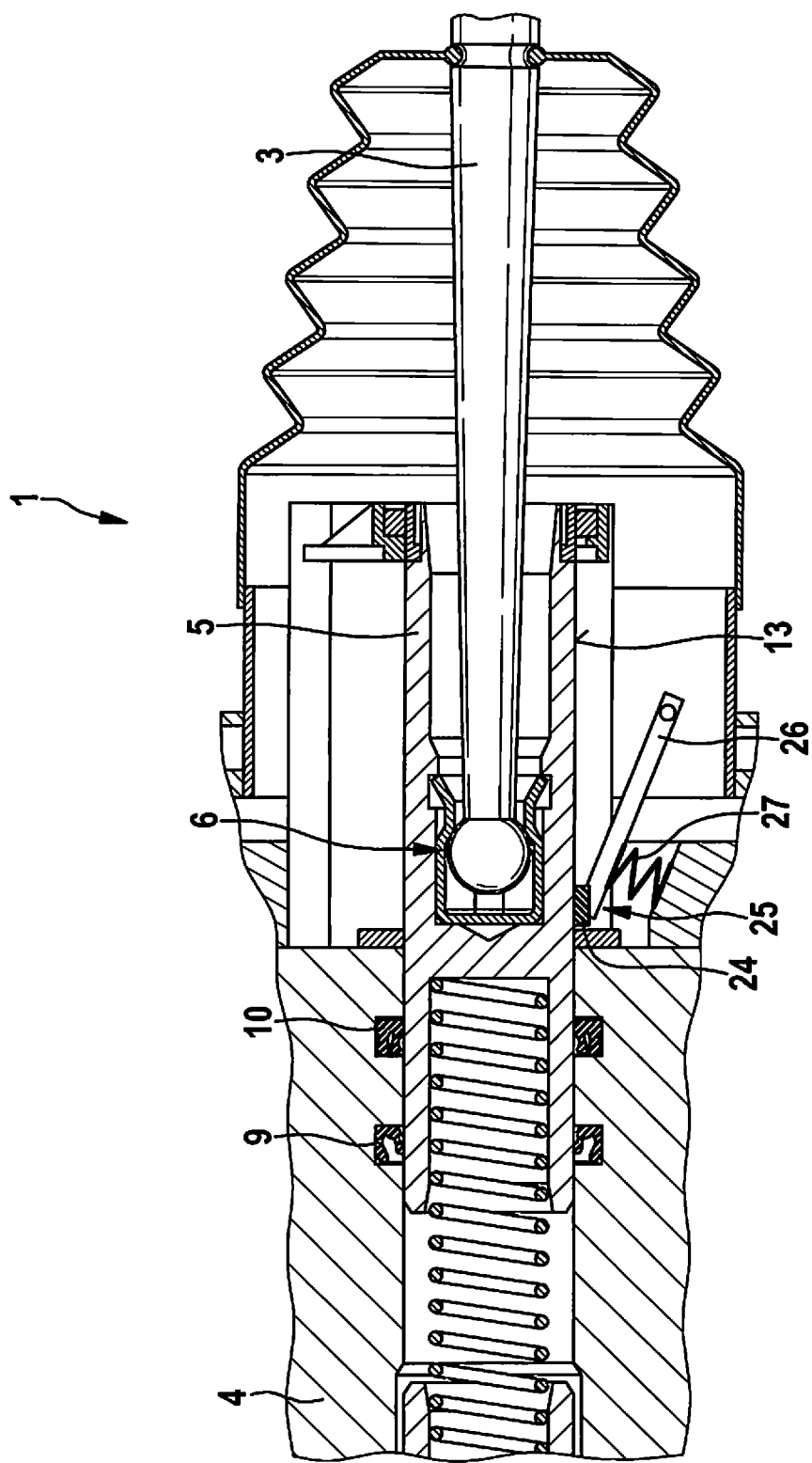
FIG. 3 shows another exemplary embodiment of the braking device in a detailed cross-sectional view.

FIG. 3 shows another exemplary embodiment of braking device 1; elements already mentioned above in connection with the preceding exemplary embodiments being provided with the same reference numerals and, in this respect, reference being made to the above description. Generally only the differences will be discussed below.

In accordance with the exemplary embodiment of FIG. 3, it is also provided that braking device 1 have a separate damping element 24. In contrast to the exemplary embodiment of FIG. 1, it is also provided that it not be annular in design. Instead, damping element 24, which, in particular, is designed to be elastically deformable, is configured at an unattached end 25 of a rocker arm 26. At the end thereof facing away from damping element 24, rocker arm 26 is pivotably mounted about a pivot axis and pressed by a spring element 27 by unattached end 25 against outer peripheral wall 13, thereby pretensioning damping element 24 against piston 5. Unattached end 25 of rocker arm 26 thereby faces actuation direction of piston 5, thereby producing the previously described damping action here as well, according to which a movement of piston 5 in actuation direction is not or is hardly damped, while a movement in the release direction leads to an increase in the static friction between damping element 24 and piston 5 due to the self-inhibiting design. Here as well, the damping element is advantageously configured outside of master brake cylinder 4.

Figure 4:
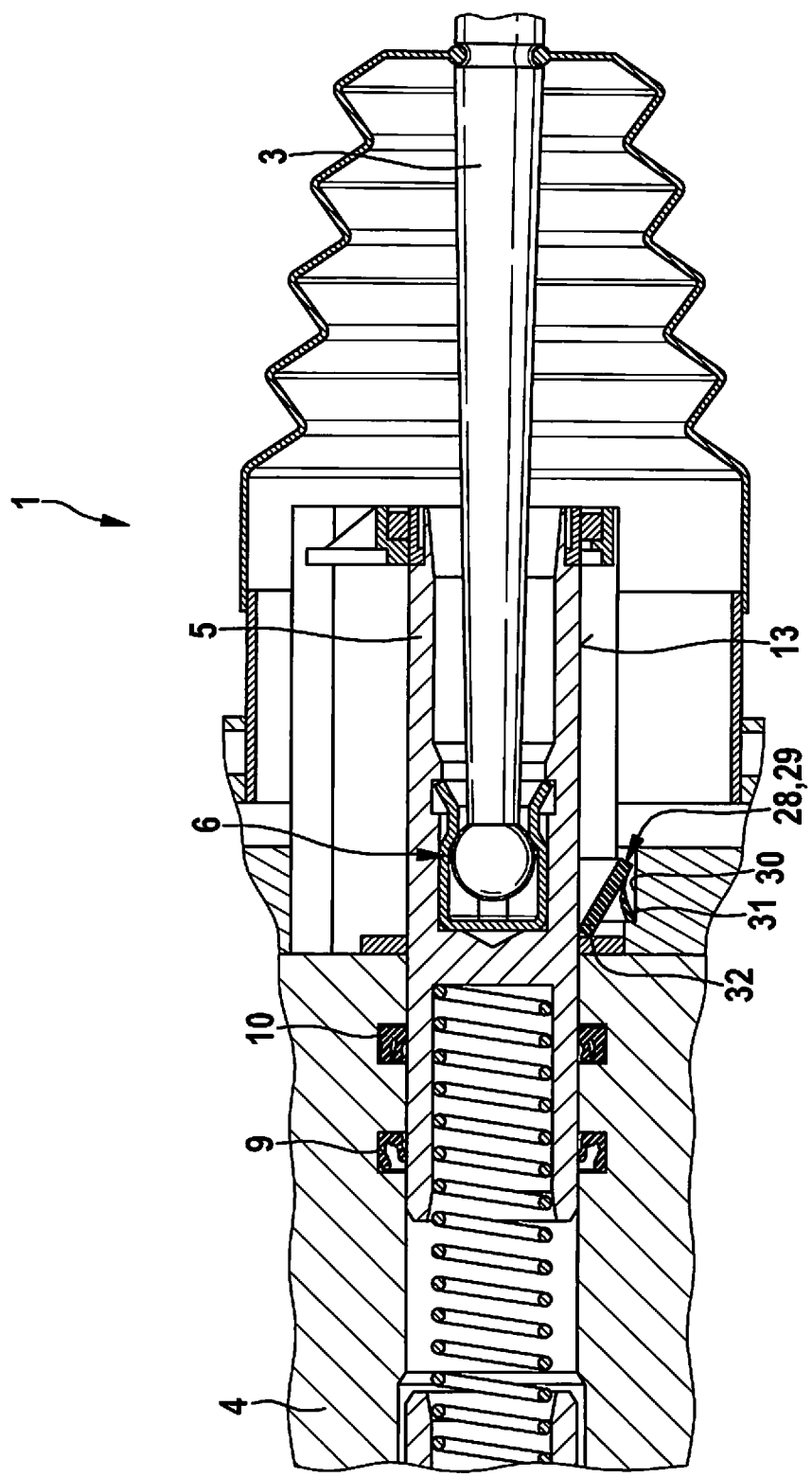
FIG. 4 shows another exemplary embodiment of the braking device.

FIG. 4 shows another exemplary embodiment that differs from that shown in FIG. 3 in that a damping element 28 is provided that is configured as a clip element 29 and is placeable/placed in a receiving recess 30 by a simple clipping into place. Clip element 29, respectively damping element 28 likewise has a supporting leg 31, as well as a sealing leg 32. Supporting leg 31 is configured as a spring element which urges sealing leg 32 against outer peripheral wall 13 of piston 5. As also previously described, the unattached end of sealing leg 32 faces the actuation direction of piston 5 to achieve the aforementioned advantages.

Figure 5:
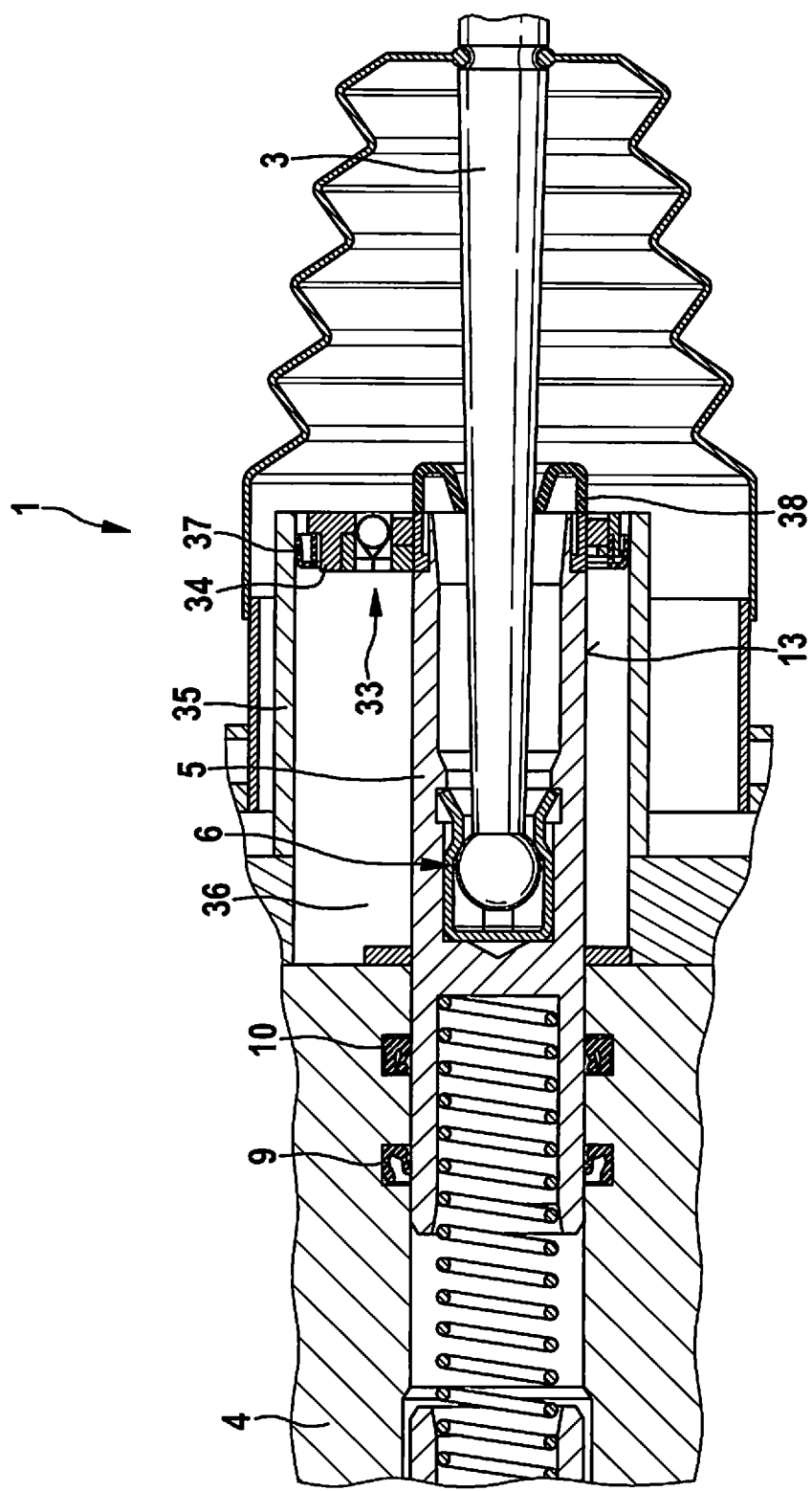
FIG. 5 shows another exemplary embodiment of the braking device, in each case in a detailed cross-sectional view.

FIG. 5 shows another exemplary embodiment; in contrast to the preceding exemplary embodiments, no frictionally engaged damping, rather a pneumatic damping of the movement of piston 5 being achieved. To that end, braking device 1 of this exemplary embodiment features a damping element 33 that is designed as a non-return valve. In a through bore, the non-return valve is associated with an annular disk 34, which extends radially between piston 5 and a cylindrical sleeve 35 that coaxially surrounds piston 5. Cylindrical sleeve 35 is thereby radially spaced at a distance from piston 5, respectively outer peripheral wall 13 thereof, resulting in a pressure chamber 36 between piston 5, the end face of master brake cylinder 4, cylindrical sleeve 35 and annular disk 34. Annular disk 34 is thereby permanently connected to piston 5 and, as a result, comoved therewith. To that end, a seal 37 is radially configured between annular disk 34 and cylindrical sleeve 35. A seal 38 is also advantageously provided between piston 5 and linkage 3.

Non-return valve is designed to release the through bore in response to piston 5 being moved in the actuation direction. As a result, no pressure above atmospheric is produced in pressure chamber 36, and piston 5 is generally freely movable. However, if piston 5 is moved in the opposite direction, thus in the release direction, then the non-return valve closes the through bore, and a pressure below atmospheric is produced in pressure chamber 36. This pressure below atmospheric impedes the movement of piston 5 in the release direction and consequently damps the movement, respectively velocity of motion thereof.

Thus, using a simple damping element, the described exemplary embodiments impede the displacement of piston 5 in the release direction and do not or hardly influence it in the actuation direction.

What is claimed is:

1. A braking device for a motor vehicle, comprising:
   an actuatable brake pedal;
   a piston of a master brake cylinder that is mechanically coupled to the brake pedal, the piston being supported in the master brake cylinder so as to be axially displaceable in an actuation direction and in a release direction; and
   at least one radial seal that acts between the piston and the master brake cylinder; and
   a damping element which is at least one of: (i) elastically deformable, and (ii) displaceable, the damping element opposing displacement of the piston in the release direction, wherein the damping element is situated at an unattached end of a rocker arm, the unattached end being pretensioned by a spring element against an outer peripheral wall of the piston.

2. The braking device as recited in claim 1, wherein the damping element is pretensioned by spring force against an outer peripheral wall of the piston.

3. The braking device as recited in claim 1, wherein the at least one radial seal is elastically deformable.

4. The braking device as recited in claim 1, wherein the damping element is outside of the master brake cylinder.

5. A braking device for a motor vehicle, comprising:
   an actuatable brake pedal;
   a piston of a master brake cylinder that is mechanically coupled to the brake pedal, the piston being supported in the master brake cylinder so as to be axially displaceable in an actuation direction and in a release direction; and
   at least one radial seal that acts between the piston and the master brake cylinder; and
   a damping element which is at least one of: (i) elastically deformable, and (ii) displaceable, the damping element opposing displacement of the piston in the release direction, wherein the damping element is a pneumatic non-return valve that seals a pressure chamber surrounding the piston and is comovable with the piston.

* * * * *